UNITED STATES PATENT OFFICE.

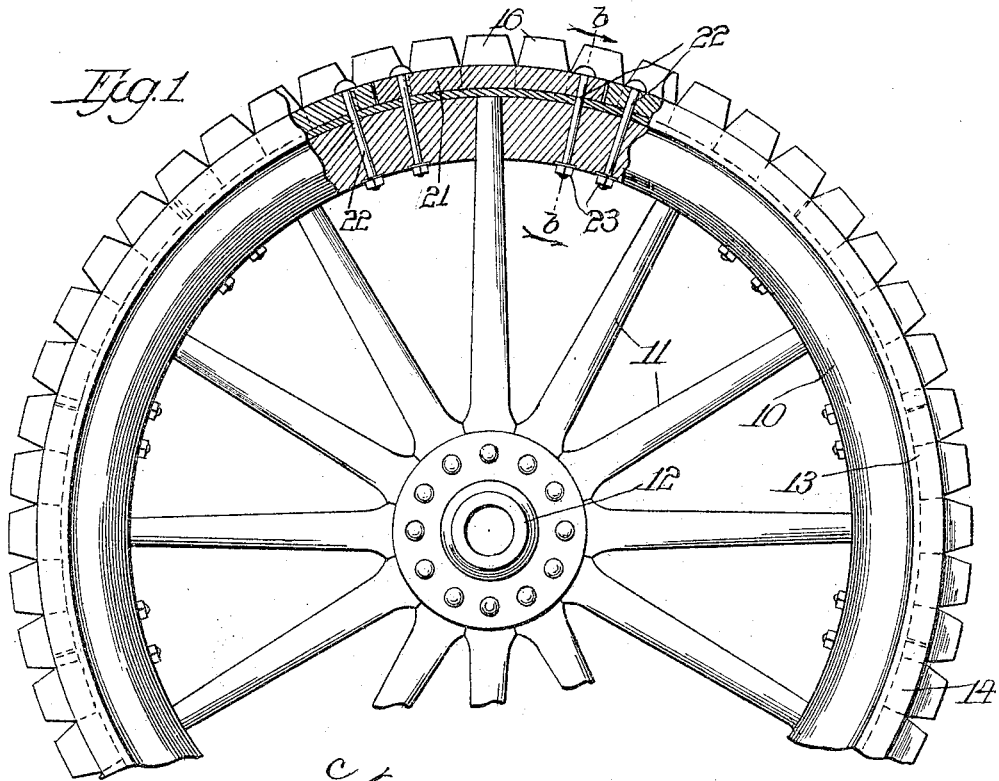

JOHN F. McCANNA, OF CHICAGO, ILLINOIS.

TIRE.

No. 807,633.　　　Specification of Letters Patent.　　　Patented Dec. 19, 1905.

Application filed August 15, 1904. Serial No. 220,726.

*To all whom it may concern:*

Be it known that I, JOHN F. McCANNA, a citizen of the United States, residing at Chicago, in the county of Cook and State of Illinois, have invented certain new and useful Improvements in Tires, of which the following is a specification, reference being had therein to the accompanying drawings.

My invention relates to improvements in vehicle-tires.

One of the objects of the invention is to provide a tire consisting of a series of sections made of any suitable material and secured in place in such manner that in case of injury to a portion of the tire such portion or the section forming that portion may be readily removed and a new section substituted without removing the whole tire.

Another object of the invention is to provide a tire consisting of a plurality of circumferential treads and a simple device for securing the treads in place and permitting of the same being readily removed.

The invention also contemplates the provision of a tire consisting of a plurality of circumferential treads, each of which comprises a series of tapering sections or blocks removably secured in place.

The invention consists of the combination and arrangement of parts hereinafter particularly described and then pointed out in the appended claims.

In the drawings, Figure 1 is a side elevation of a wheel provided with a tire constructed in accordance with my invention, a portion of the same being in section on the line $a\,a$ of Fig. 2. Fig. 2 is a section on the line $b\,b$ of Fig. 1. Fig. 3 is a perspective view of one of the blocks of which the tire is composed. Fig. 4 is a perspective view of one of the keys for securing the tire in position. Fig. 5 is a side elevation of a portion of a wheel provided with a continuous tire, and Fig. 6 is a section on the line $c\,c$ of Fig. 5.

In the drawings, 10 indicates the felly of an ordinary wheel having a flat periphery, as shown in Figs. 2 and 6, 11 the spokes, and 12 the hub. This wheel may be of any desired size and may be made of any preferred material, and the parts referred to may be of the usual and common construction of the ordinary vehicle-wheel. Encircling the felly 10 is a rim 13, which is preferably of steel and may be secured thereon in any desired manner, as by shrinking the same on the felly in the manner well understood by those skilled in the art. The rim 13 is designed to form a seat for the tire, and to this end is provided at its edges with outwardly-extending or peripheral flanges 14, the inner faces of which extend inwardly or toward each other, as by beveling or inclining the inner faces of the flanges, as shown, thereby providing a circumferential groove 15, which, as shown in Figs. 2 and 6, is dovetail-shaped in cross-section and provides a seat in which the tire is removably secured, in the manner hereinafter described.

In the present embodiment of the invention I have illustrated the tire as composed of a plurality of treads. These treads may be continuous, as shown in Fig. 5, but are preferably made of sectional form, as shown in Figs. 1, 2, and 3. Referring to the said figures, 16 indicates a block of rubber, wood, fiber, or other suitable material and of suitable dimensions. Preferably, though not necessarily, these blocks are of the shape shown in Fig. 3, the base 17 thereof being curved to conform to the curvature of the rim and the sides 18 tapering inwardly, so that when such blocks are seated in the groove 15 the outer sides of the same fit snugly against the tapering flanges 14, as shown in Fig. 2. The abutting ends of the blocks are radial for a short distance at the base, as at 19, and then taper inwardly, as clearly shown at 20 in Figs. 1 and 3. As thus constructed, when the blocks are seated in the groove and secured, the ends 19 of the blocks abutting, the tire is, in effect, corrugated transversely, as well as circumferentially, of the wheel, and as each block is provided at its tread-surface with angular edges slipping, as well as skidding, is effectually prevented, owing to engagement of the angular edges with the ground or road. To secure the blocks in position, the keys 21 are provided. Each of such keys consists of a strip of any suitable material substantially wedge-shaped in cross-section, which when in its securing position is disposed with its narrower face toward the rim. The inclined sides of the wedge strips are of substantially the same angle as the inclined sides 18 of the blocks 16, as shown in Fig. 2. The wedge strips may be of any suitable length and are curved to conform to the curvature of the rim 13. In the present embodiment of the invention each wedge strip is of sufficient length to extend at its ends to a point about midway between the adjacent spokes of the wheel and abut end to end, as shown in Fig. 1, and bolts 22, passing through alined apertures in the wedge, rim, and felly and provided with nuts 23, secure the parts firmly together.

In assembling the tire after the rim is placed on the felly two rows of the blocks are seated in the groove 15 and the wedge strip inserted between the rows. The bolts at the end of the wedge strip having been passed through the apertures provided therefor and the blocks of each row pressed together, so that the straight sides of the same abut snugly together, the nuts are screwed up, thereby drawing the wedge strip toward the rim and pressing the blocks firmly against the flanges, the inclined faces of the wedge and flanges coöperating to hold the blocks securely in position. This operation is continued until the entire tire is assembled. In the event that any block is damaged or becomes worn it is only necessary to remove the wedge strip securing such block and remove the same, replacing it with a new block. This avoids removing the entire tire and greatly facilitates repairing the tire when only a portion of the same is injured or becomes unduly worn. The user may be supplied with additional blocks similar to those of which the tires are made and owing to the simplicity of the device and the readiness with which the blocks are removed and secured in place may make his own repairs, skilled labor being unnecessary. I do not, however, limit myself to a tire of the sectional character described, as the same means for securing the treads may be employed with the ordinary clencher-tires, as shown in Figs. 5 and 6. As there shown, 24 indicates a pair of ordinary clencher-tires seated in the groove of the rim and provided with the usual inner inflating-tubes 25 and nipples 26. The wedge strips interposed between the bases of the tires secure the same to the rim in the same manner that the tire illustrated in Figs. 1 and 2 is secured, and they may be removed for repairs merely by removing the wedge strips, as heretofore described. The bolts 22 not only secure the wedge strip in position, but also serve to clamp the rim 14 more securely to the felly.

As no special construction of wheel is necessary, the tire may be readily adapted to the ordinary wheels, and such wheels may be secured from the manufacturer without the usual iron or other tire and need not be specially made for the purpose. The tire may also be applied to wheels that have been in service—as, for example, the ordinary iron-tired wheels in general use—it being necessary only to remove the iron tire and bore holes through the felly to receive the bolts 22.

In the embodiments of the invention illustrated the rim is shown as of greater width than the felly in order to provide a wide tire or one having a wide tread-surface, such arrangement being particularly desirable when the tires are to be used with vehicles of great weight, such as automobiles, drays, and heavy wagons. It is to be understood, however, that the rim may be of any desired width, and such width, as well as the width of the tread-surface and the dimensions of the blocks 16, will depend on the nature of the use of the tire. It is also to be understood that I do not limit myself to the specific construction of the rim or shape of the blocks 16 illustrated and described, as they may be variously modified without departing from the spirit of the invention, and while I have shown a wheel having a wooden felly of the ordinary character it is obvious that the felly may be of metal and the rim 14 formed integral therewith.

Having described my invention, what I claim, and desire to secure by Letters Patent, is—

1. A device of the class described, consisting of a rim, and a series of circumferentially-abutting blocks having flat tread-surfaces and inclined sides and ends and radial abutting portions.

2. In a device of the class described, the combination with a rim having a circumferential groove provided with inclined faces, rows of blocks seated in the groove, and independent wedge strips between the rows for securing the blocks in place.

3. In a device of the class described, the combination with a wheel provided with a felly, a rim on the felly and having a circumferential dovetail groove, rows of tapering blocks seated in the groove, wedge strips located between the rows of blocks, and bolts passing through the wedge strips, the rim and felly for securing the wedge strips independently of each other.

4. In a device of the class described, the combination with a rim having a circumferential dovetail groove, a pair of treads seated in the groove and adapted to the inclined sides of the groove and consisting of independent blocks, a series of wedge strips located between the treads and clamping the latter in place, and bolts for securing the wedge strips independently of each other.

5. In a device of the class described, the combination with a wheel-felly, a rim having a circumferential dovetail groove, a plurality of circumferential rows of independent blocks adapted to the groove and having inclined sides and ends and flat tread-surfaces, a series of wedge strips located between the rows of blocks, and bolts passing through the strips, rim and felly for securing each strip independently of the others and the tire and rim to the felly.

6. In a device of the class described, the combination with a rim having a circumferential dovetail groove, a plurality of treads seated in the groove and having inclined outer sides coöperating with the inclined sides of the groove, circumferential wedge strips located between the treads the inner sides of which are inclined to correspond with the inclined faces of the wedge strips, and bolts for wedging the strips between the treads and for securing such strips independently of each other to the rim.

In testimony whereof I affix my signature in presence of two witnesses.

JOHN F. McCANNA.

Witnesses:
 E. MOLITOR,
 ARTHUR B. SEIBOLD.